(12) United States Patent
Nanni

(10) Patent No.: US 6,614,806 B1
(45) Date of Patent: Sep. 2, 2003

(54) METHOD AND APPARATUS FOR INTERFERING RECEIVER SIGNAL OVERLOAD PROTECTION

(75) Inventor: Peter Nanni, Algonquin, IL (US)

(73) Assignee: Motorola Inc., Schaumburg, IL (US)

(*) Notice: Subject to any disclaimer, the term of this patent is extended or adjusted under 35 U.S.C. 154(b) by 0 days.

(21) Appl. No.: 09/478,224

(22) Filed: Jan. 6, 2000

(51) Int. Cl.[7] .................................................. H04J 3/16
(52) U.S. Cl. ..................... 370/468; 370/333; 370/465; 370/252; 455/234.1; 455/245.1; 455/266; 455/254
(58) Field of Search ............................... 370/332, 329, 370/333, 341, 252, 465, 468, 431; 455/234.1, 266, 245.1, 254, 67.1, 67.3, 552, 553, 426; 375/345, 346

(56) References Cited

U.S. PATENT DOCUMENTS

| 3,872,387 | A | * | 3/1975 | Banach |
| 4,355,303 | A | * | 10/1982 | Phillips et al. |
| 4,356,567 | A | * | 10/1982 | Eguchi et al. |
| 4,356,568 | A | * | 10/1982 | Ogita et al. |
| 4,563,651 | A | * | 1/1986 | Ohta et al. |
| 4,792,993 | A | * | 12/1988 | Ma |
| 5,020,092 | A | | 5/1991 | Phillips et al. |
| 5,060,294 | A | | 10/1991 | Schwent et al. |
| 5,230,098 | A | * | 7/1993 | Seki |
| 5,251,331 | A | | 10/1993 | Schwent et al. |
| 5,263,055 | A | * | 11/1993 | Cahill |
| 5,287,556 | A | * | 2/1994 | Cahill |
| 5,301,364 | A | * | 4/1994 | Arens et al. |
| 5,321,851 | A | * | 6/1994 | Sugayama et al. |
| 5,339,454 | A | * | 8/1994 | Kuo et al. |
| 5,438,684 | A | | 8/1995 | Schwent et al. |
| 5,448,763 | A | * | 9/1995 | Gillig |
| 5,598,448 | A | * | 1/1997 | Girardeau, Jr. |
| 5,603,115 | A | * | 2/1997 | Ku |
| 5,604,927 | A | * | 2/1997 | Moore |
| 5,630,220 | A | * | 5/1997 | Yano |
| 5,691,666 | A | * | 11/1997 | Owen |
| 5,715,282 | A | * | 2/1998 | Mansouri et al. |
| 5,732,341 | A | | 3/1998 | Wheatley, III |
| 5,734,974 | A | * | 3/1998 | Callaway, Jr. et al. |
| 5,828,672 | A | * | 10/1998 | Labonte |
| 5,862,465 | A | * | 1/1999 | Ou |
| 5,898,699 | A | * | 4/1999 | Chiba |
| 5,949,832 | A | * | 9/1999 | Liebetreu |
| 6,009,129 | A | * | 12/1999 | Kenney et al. |
| 6,070,062 | A | * | 5/2000 | Yoshida et al. |
| 6,442,143 | B1 | * | 8/2002 | Corry |
| 6,476,681 | B1 | * | 11/2002 | Kirkpatrick |

FOREIGN PATENT DOCUMENTS

EP          0696852          8/1995

* cited by examiner

Primary Examiner—Ajit Patel
Assistant Examiner—Steven A Blount
(74) Attorney, Agent, or Firm—Roland K. Bowler, II; Daniel Collopy; Rolland R. Hackbart

(57) ABSTRACT

A method and apparatus for controlling incoming power to a receiver in a dual mode communication device. According to the method and apparatus, the received signal is simultaneously processed by two separate filters, one filter to process the incoming desired communication signal and the other filter to process the noise for power estimation. With the communication device operating in a first mode initial filtering is attuned to the corresponding bandwidth. When the noise level reaches a predetermined level, the first bandwidth is adjusted to get a better estimate of the noise present. In Response to high noise levels, the incoming gain to the receiver is adjusted accordingly.

13 Claims, 5 Drawing Sheets

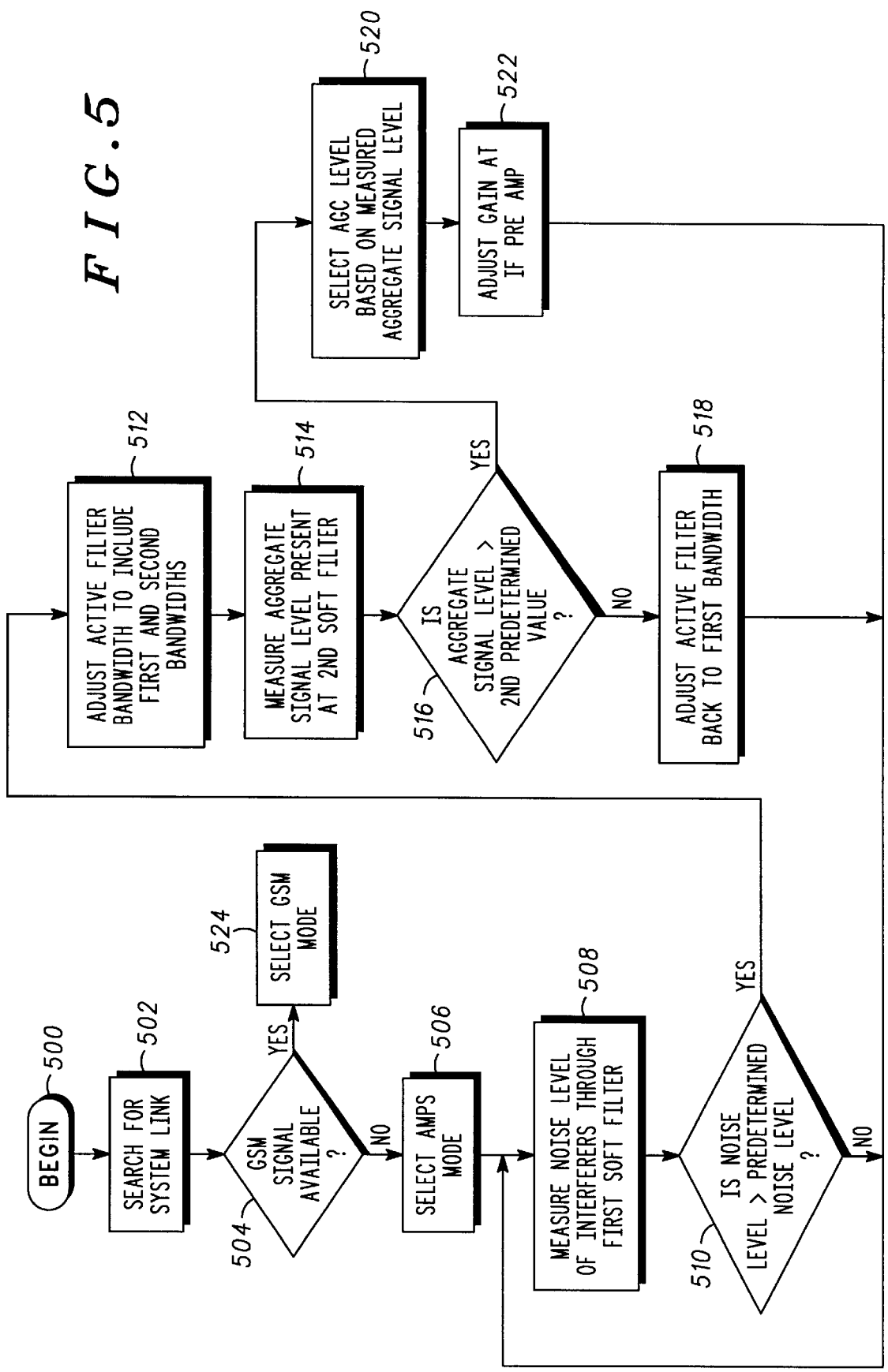

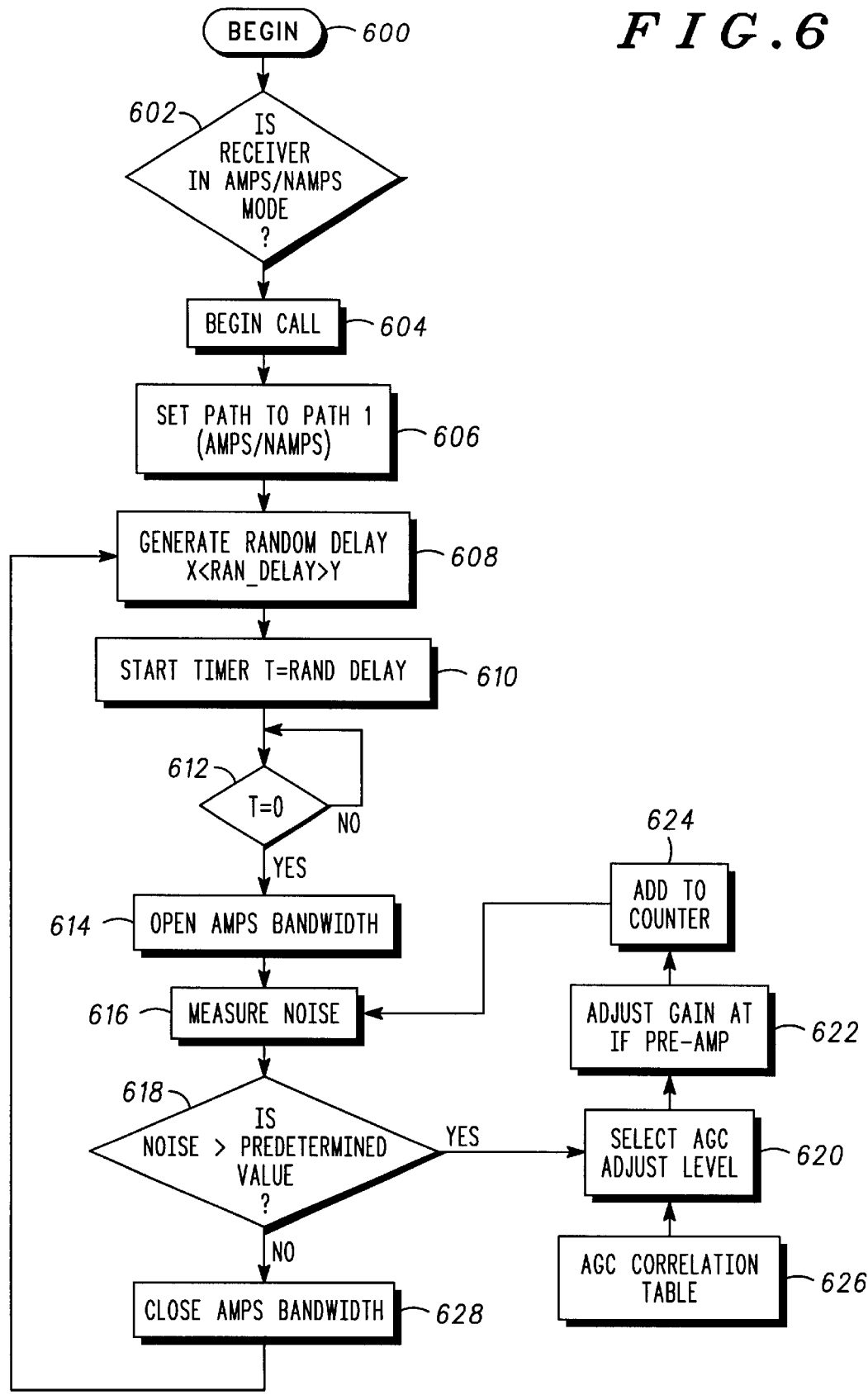

METHOD AND APPARATUS FOR INTERFERING RECEIVER SIGNAL OVERLOAD PROTECTION

BACKGROUND OF THE INVENTION

The present invention relates to the control of radio frequency (RF) signal power received in a multi band receiver. More particularly the invention relates to a method and apparatus for detection of interference energy from RF signals present in adjacent bandwidths and controlling the energy received in the baseband portion of the receiver to ensure that said baseband circuitry is not saturated or overdriven.

A dual mode communication device is designed to transmit and receive RF signals of either an analog or a digital nature. The method for transmitting analog RF signals is typically achieved using the advanced mobile phone system (AMPS) and the transmission method of digital RF signals may be chosen from a plurality of multiple access techniques including time division multiple access (TDMA), code division multiple access (CDMA), and global system for mobile communication (GSM). A multi mode device such as a dual mode device will combine some of these techniques and incorporate them into one device. The receiver portion of a dual mode communication device for example, is similar to those which are not dual mode but are adapted to receive a combination of signals in accordance with any two of the methods above, analog or digital.

Typical receiver circuitry comprises two general portions: a front end portion and a back end portion. The front end portion functions to perform initial filtering, amplification of the desired bandwidth, and conversion to an intermediate frequency for further processing by the backend portion of the receiver. The backend portion converts the signal to the baseband in preparation for digital signal processing. RF signals enter the front end portion via the antenna and are transferred from the front end to the back end.

Controlling the incoming signal power of a radio frequency receiver is essential to proper operation of the receiver as the control functions to maintain signal levels within the operating range of the baseband circuitry. If the signal level exceeds the operating range of said baseband circuitry, the receiver performance degrades as a result of the decreasing signal to noise ratio and receiver selectivity. This may occur when interfering adjacent signals are very strong compared to the desired on-channel signal and the baseband circuitry becomes saturated as a result of the overload. This results in the desired on-channel signal becoming desensitized. Therefore, it is necessary to control the received signal power prior to the baseband circuitry and maintain signal levels within the back end circuit's operating range. Filter portions of the baseband circuitry reduce the adjacent interference noise signals by allowing only the desired on-channel frequency to pass through. However, the incoming aggregate power level prior to the baseband circuitry comprises the desired communication signal as well as the interfering noise energy. The combination of these two can lead to saturation of the baseband circuitry as a result of the noise level becoming too high.

One typical method of control is to provide measurement circuitry prior to the baseband circuitry such that a power estimation of the interfering noise level can be made. A conventional means for power estimation is to measure the aggregate received power level and provides measurement data to the received signal strength indicator (RSSI). The RSSI through additional circuitry, provides a control signal to the automatic gain control (AGC) corresponding to the estimated power level. The signal provided to the AGC from the RSSI is used to control the gain of the aggregate received power level entering the baseband circuitry. As the aggregate received power level increases, the AGC reduces the signal gain. This provides control of the incoming signal power but is performed with the disadvantages of additional cost of extra circuitry, increased integrated circuit (IC) size, and increased land requirement on the printed circuit board (PCB).

The use of additional circuitry poses a problem as this requires more space within the device and cost reduction is almost always desired. Therefore, there is a need to improve the means and method of detecting and controlling the noise entering the receiver.

BRIEF DESCRIPTION OF THE DRAWINGS

FIG. 5 is a flow chart illustrating the steps measuring and adjusting the gain accordingly in a trigger mode fashion in accordance with the preferred embodiment of the present invention.

FIG. 6 is s flow chart showing the steps of measuring and adjusting the gain in a sampling mode fashion in accordance with the preferred embodiment of the present invention.

DESCRIPTION OF THE PREFERRED EMBODIMENT

The present invention provides a unique method and apparatus to prevent power overload due to interfering noise present near the desired communication signal frequency in a multi mode receiver circuit for a wireless communications device. In the preferred embodiment of the present invention the dual mode receiver receives radio frequency (RF) signals from a first bandwidth attuned to the advanced mobile phone system (AMPS) and a second bandwidth attuned to the global system for mobile communication (GSM) in a portable wireless radiotelephone.

All receivers whether they are single mode, dual mode, or multi mode require some means to maintain the level of the received RF signal within the operating range of the receiver circuitry. The present invention improves the current method of controlling aggregate received power in the receiver using existing components necessary in dual mode communication device and eliminating the need for additional circuitry used in prior methods. Instead of adding circuitry, which in turn adds cost and increases the device size, the present invention advantageously utilizes the existing circuitry in combination with software solutions for the processing of the RF signals from multiple bandwidths necessary in a dual mode communication device.

Figure 1:
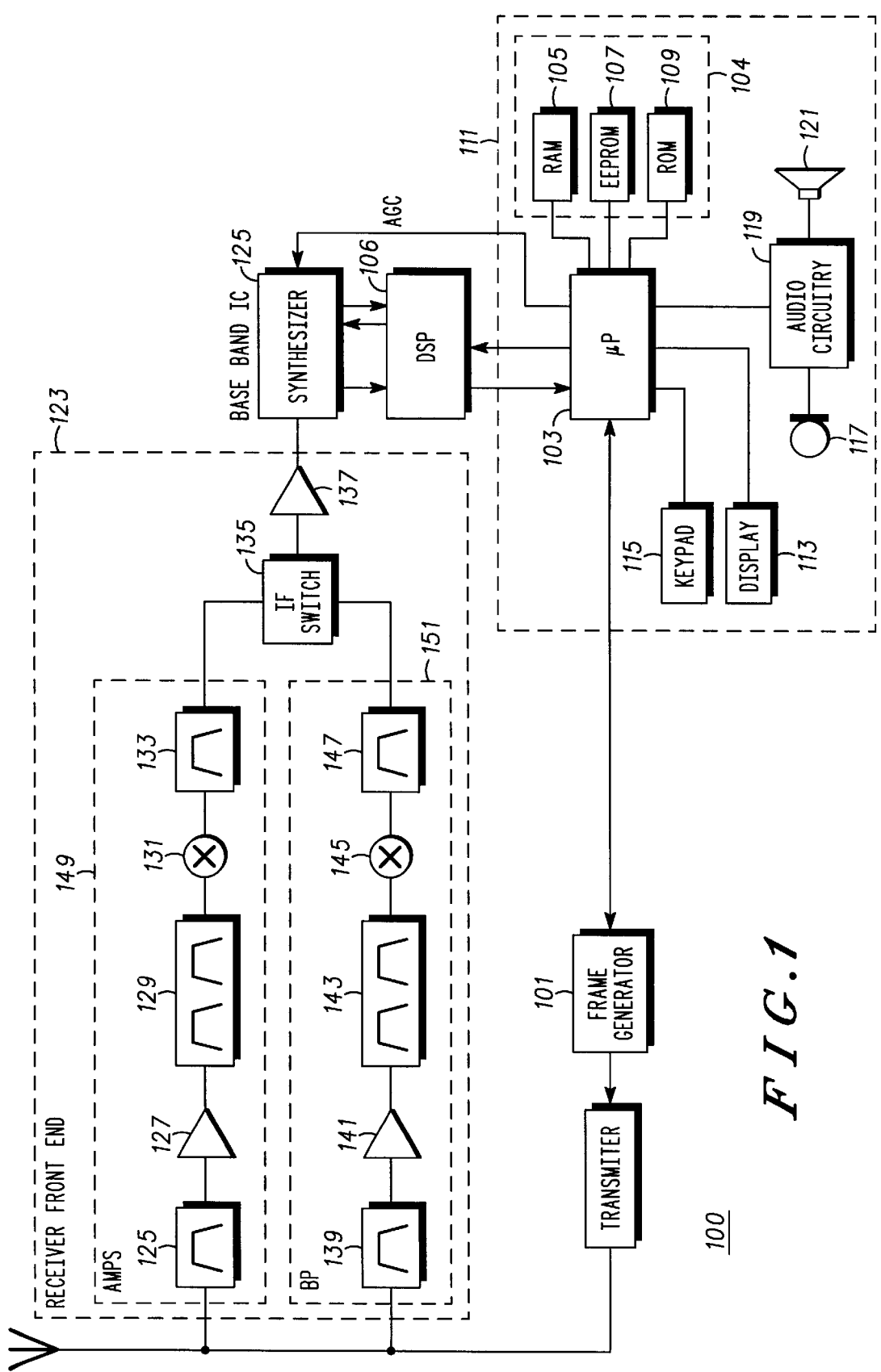
FIG. 1 shows a block diagram of a conventional dual mode radio frequency receiver.

Turning to FIG. 1, a block diagram of a wireless communication device in accordance with the preferred embodiment of the present invention is shown. This device is a cellular radiotelephone incorporating the present invention.

In the preferred embodiment a frame generator ASIC 101, such as a CMOS ASIC available from Motorola, Inc. and a microprocessor 103, such as a 68HC11 microprocessor also available from Motorola, Inc., combine to generate the necessary communication protocol for operating in a cellular system. Microprocessor 103 uses memory 104 comprising RAM 105, EEPROM 107, and ROM 109, preferably consolidated in one package 111, to execute the steps necessary to generate the protocol and to perform other functions for the wireless communication device, such as writing to a display 113, accepting information from a keypad 115, or controlling a frequency synthesizer 125 and DSP 106 which includes controlling receiver gain in accordance with the present invention. ASIC 101 processes audio transformed by audio circuitry 119 from a microphone 117 and to a speaker 121.

FIG. 1 also shows the front end receiver circuitry 123 which is capable of receiving RF signals from two distinct bandwidths which is required for operation of a dual mode communication device. The front end receiver is comprised of two channels: channel one 149 for operating in a first desired mode and channel two 151 for operating in a second desired mode. In accordance with the preferred embodiment of the present invention, channel one 149 is attuned to receive AMPS communication signals and channel two 151 is attuned to receive GSM communication signals. The AMPS communication system operates from 824 MHz to 894 MHz, which is subdivided into 30 kHz channels. The GSM communication system operates in the 1850 MHz to 1990 MHz subdivided into 200 kHz channels. Depending on the operation mode of the communication device, the IF switch 135 will be programmed to the appropriate corresponding channel. The IF switch 135 is coupled to a synthesizer 125 which performs baseband (BB) conversion and appropriate active filtering which is necessary for demodulation of the desired communication signal.

Figure 2:
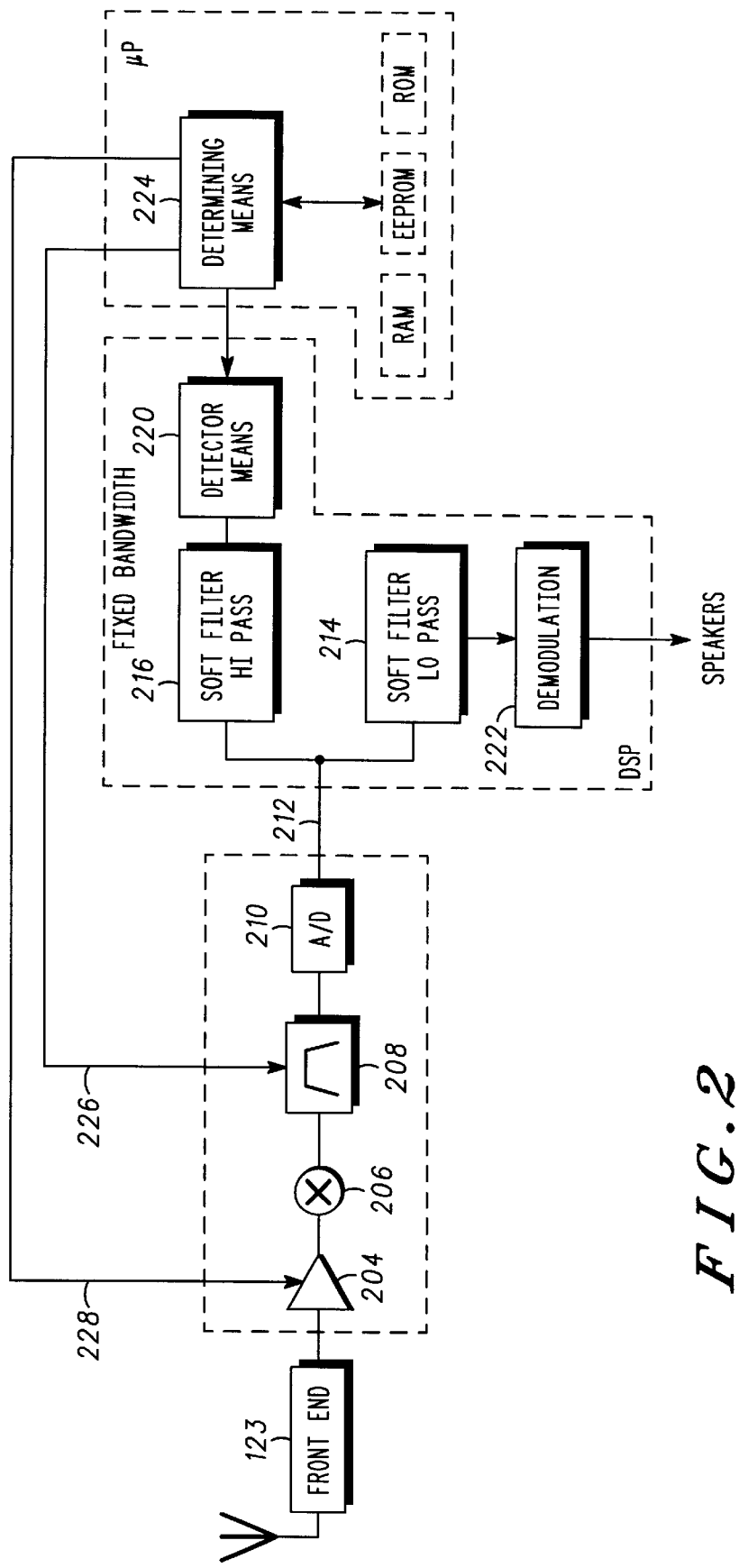
FIG. 2 shows a block diagram of the backend portion of the receiver in accordance with the preferred embodiment of the present invention.

The synthesizer 125, DSP106, and microprocessor 103 are shown in greater detail in the block diagrams of FIG. 2. The synthesizer contains an IF pre-amp 204, an IF mixer 206, an active baseband (BB) filter 208, and an analog to digital converter 210. IF pre-amp 204 provides automatic gain control (AGC) means to control the aggregate signal gain input to the BB mixer 206 and the active BB filter 208 as both are susceptible to overload. The AGC 204 circuit therefor maintains the BB circuitry power level within the designed operating range so the receiver may function properly. The BB mixer converts the IF signal into a second IF frequency which is then subsequently filtered by active BB filter 208. Active BB filter 208 functions to allow only the desired communication signal to pass for further processing. The size of the bandwidth is adjustable in response to control signals sent by the microprocessor 103. While receiving a desired communication signal the active BB filter 208 bandwidth is set accordingly and extraneous noise near the desired communication signal is filtered out as much as possible by the active BB filter 208. All unwanted noise however can not be filtered and residual noise passes on to further processing.

Once the desired signal is filtered by the active BB filter 208 the signal is converted to a digital signal by the analog to digital converter 210. This converter takes all signals (desired communication signal and noise) and converts them to digital data bits which are then passed on to the DSP 106 via a serial data link 212 for additional soft filtering and demodulation.

Figure 3:
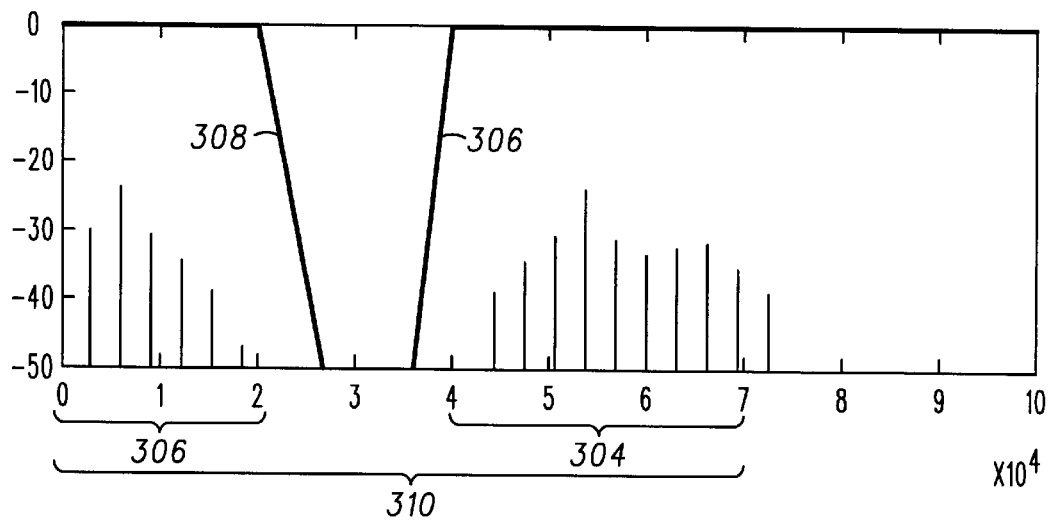
FIG. 3 shows the baseband frequency spectrum including the desired signal and the noise signal in accordance with the preferred embodiment of the present invention.

FIG. 2 further shows the DSP in which the digital data signal is split into two channels from a common node. A first receiving channel, which is comprised of a first soft filter 214 and a second receiving channel, which is comprised of a second soft filter 216, both channels processing the incoming signal simultaneously. In accordance with the preferred embodiment of the present invention the first soft filter 214 is a low pass filter and processes the desired AMPS communication signal bandwidth. The second soft filter 216 is programmed as a high pass filter, attenuating the desired AMPS communication signal while allowing the undesired noise to pass through to the detector 220. FIG. 3 shows the desired communication signal 302 and the undesired noise 304 at baseband frequencies. The combination of the desired communication signal 302 and the undesired noise 304 is the aggregate received signal 310. FIG. 3 also shows the DSP low pass soft filter response 308 and the DSP high pass soft filter response 306. The detector 220 estimates the power of said undesired noise 304 passed though the high pass soft filter 216 and provides this estimate to the determining means 224 in the microprocessor 103.

Figure 4:
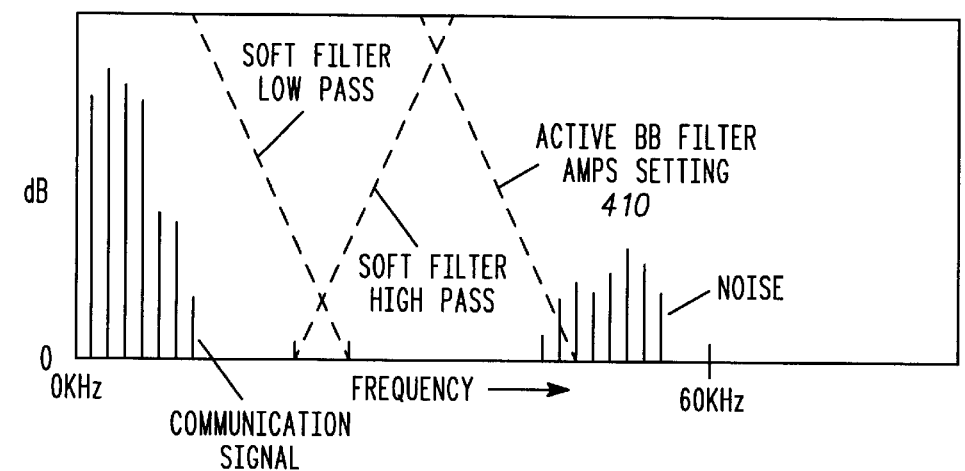
FIG. 4 shows the baseband frequency spectrum illustrating the active baseband filter settings.
Figure 4:
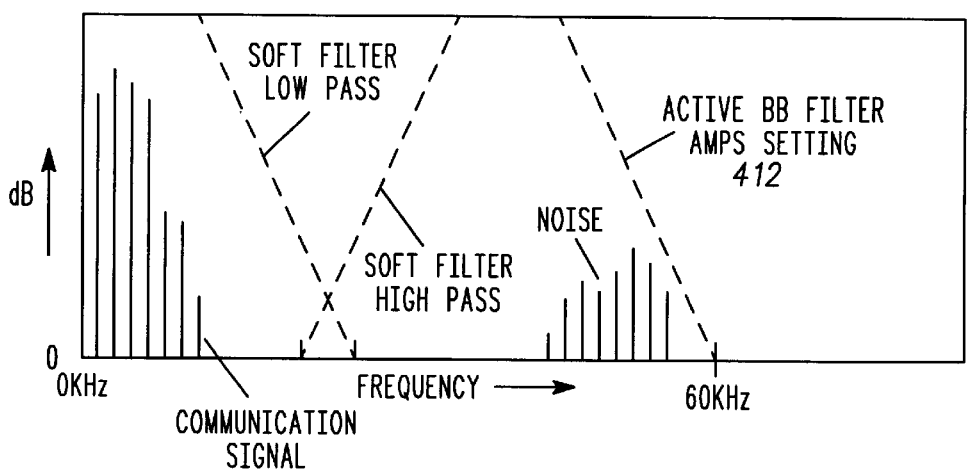

The determining means 224 in the microprocessor 103 compares the undesired noise 304 level to a first predetermined noise level. If the undesired noise 304 level is greater than the first predetermined noise level, the determining means sends a signal to the active BB filter 208 to increase the BB bandwidth from the AMPS setting to the GSM setting. FIG. 4 shows in accordance with the preferred embodiment of the present invention the BB bandwidth 410 of 15 kHz for the AMPS setting and the BB bandwidth 412 of 100 kHz for the GSM setting. Once the BB bandwidth is increased, the detector 220 makes a second power estimation of the undesired noise 304 passing through the high pass soft filter 216 and provides the estimate to the determining means in the microprocessor 103.

If the estimated power level of the undesired noise 304 is greater than a second predetermined noise level, the determining means sends a signal 228 to the AGC 204 to reduce the aggregate received signal power. The amount the aggregate received signal 310 power is reduced is inversely proportional to the estimated noise power level. The higher the estimated undesired noise 304 level, the greater the reduction in the aggregate received signal 310 power.

FIG. 5 shows a flowchart of the preferred steps for triggering noise measurements in the present invention. After beginning at step 500, the receiver checks the mode of operation in step 502. If the receiver is in AMPS mode the receiver continues to step 508, which is to measure the noise level passing through said second soft filter 216. The communication device will then determine if the measured noise level is greater than a first predetermined noise level at step 510. If the noise level is greater than the predetermined value, this indicates there may be more noise present but since the active BB filter 208 is attuned to the bandwidth required for AMPS mode, some of the interfering noise is attenuated by the active BB filter 208 and therefor cannot pass to the second soft filter. In this case, the communication device makes the decision to increase the bandwidth of the active filter 208 which corresponds to step 512. Once the bandwidth of the active BB filter 208 is increase any noise initially outside of the bandwidth will now be captured and measured at step 516. Now the communication device will compare the noise level of the increased bandwidth to a second predetermined noise level. This measurement gives a better estimate of the power input to the IF mixer 206 and the active BB filter 208. If this level is greater than the second predetermined noise level, which is equal to the minimum receiver sensitivity, the communication device will select a necessary AGC setting in accordance with the measured noise value at step 520. The microprocessor 103 then sends a corresponding signal to the AGC to reduce the gain into the IF mixer 206 and the active filter 208 to assure that these circuits are not saturated.

Turning to FIG. 6, a second flow chart shows the preferred steps of sampling noise levels and adjusting incoming power according to the present invention. As in FIG. 5, the communication device checks the mode of operation in step.502. If the mode is AMPS, the device generates a random time delay between one and two seconds for selecting an a periodic sampling rate. The device then proceeds to step 610 and starts a countdown timer. Once the countdown timer reaches zero in step 612, the device sends a signal to the active BB filter 208 to increase the bandwidth to include the bandwidth attuned to the GSM mode. In accordance with the preferred embodiment of the present invention, the bandwidth increases from 15 kHz to 100 kHz. At step 618 the detector 220 estimates the noise power level passed through soft filter 216 and sends this information to the microprocessor 103. In the microprocessor, the estimated noise power level is compared to the second predetermined power level at step 618. If the estimated noise power level is greater than said second predetermined power level, the device proceeds to step 620 and calculates an AGC adjustment level based on the estimated noise power level. The device then sends a corresponding signal to the AGC and the incoming aggregate signal power is adjusted accordingly. If the noise level measured in step 616 is less than the second predetermined noise level, then the device proceeds to step 628 and returns the active BB filter 208 to the first bandwidth attuned to the AMPS mode and resumes normal operation. Because the DSP processes the incoming signal in parallel, the noise is measured coincidentally with the processing of the desired communication signal. The first soft filter, processing the desired communication signal, attenuates the noise, while the second soft filter of the second channel measures the noise level and makes the adjustments in accordance with the flow charts above.

The present invention finds particular application in assuring that the incoming aggregate power level does not overload the baseband circuitry causing saturation. The method and apparatus provides the gain control using the existing circuitry in dual mode communication device eliminating the need for additional circuitry hence saving space on the printed circuit board and within the integrated circuits. The ever increasing power of DSP technology allows for the simultaneous measurements of the noise level and processing of the desired communication signal to provide seamless power control. The method and apparatus also allows for greater control over the AGC adjustment level as the level is calculated based on the measured aggregate power level as opposed to using predetermined AGC adjustment level.

Although the invention has been described and illustrated in the above description and drawings, it is understood that this description is by way of example only and that numerous changes and modifications can me made by those skilled in the art without departing from the true spirit and scope of the invention. For example, although method and apparatus for controlling incoming signal power into a RF device is shown, the device may also be a light based device receiving communication signals in the form of light waves. Although the present invention finds particular use in portable cellular radiotelephones, the invention could be applied to any wireless communication device, including pagers, electronic organizers, and computers. Applicant's invention should be limited only by the following claims.

What is claimed is:

1. A method for preventing saturation of a radio frequency receiver having a first bandwidth comprising the steps of:
   receiving an input communication signal from within said first bandwidth through a first receiving path;
   measuring a noise level from within said first bandwidth through a second receiving path while coincidentally receiving said input communication signal through said first receiving path;
   comparing said noise level of said second path to a first predetermined noise level; and
   adjusting said first bandwidth to a second bandwidth which is greater than said first bandwidth in response to said comparing step determining that said noise level is greater than said first predetermined noise level.

2. The method of claim 1 further comprising the step of measuring said noise level from within said second bandwidth through said second receiving path in response to said comparing step determining that said noise level is greater than said first predetermined noise level, simultaneously with said input communication signal.

3. The method of claim 2, further comprising the step of adjusting an incoming signal gain in response to said measuring step determining that said noise level of said measuring step is greater than a second predetermined noise level.

4. A receiver for receiving a communication signal, said communication signal having an aggregate received power level, said receiver comprising:
   a first path for receiving a desired communication signal from within a first desired bandwidth, said desired communication signal having a noise level;
   a second path for coincidentally receiving said noise level; and
   determining means for determining said aggregate noise level of said second path.

5. The receiver of claim 4 further comprising a first adjusting means for increasing said first bandwidth to a second bandwidth in response to said determining means determining that said aggregate noise level is greater than a first predetermined noise level.

6. The receiver of claim 5 further comprising a second adjusting means coupled to said first adjusting means for adjusting said aggregate received power level in response to said determining means determining that said aggregate noise level form within said second bandwidth is greater than a second predetermined noise level.

7. A dual mode radio frequency receiver for receiving advanced mobile phone system (AMPS) communication signals and global system for mobile communications (GSM) communication signals, said receiver comprising:
   a front end portion for receiving said AMPS and said GSM communication signals;
   automatic gain control (AGC) means coupled to said front end for controlling an aggregate signal gain received from said front end;
   active filter means coupled to said AGC and having a variable bandwidth, said variable bandwidth selectively adjustable to define a first bandwidth attuned with AMPS signal processing for allowing AMPS communication signals to pass therethrough and to define a second bandwidth attuned with GSM signal processing for allowing GSM communication signals to pass therethrough;
   conversion means coupled to said active filter means for converting said GSM communication signal and converting said AMPS communication signal into digital signals and providing said digital signals to a node;

a low pass filter coupled to said node by a first channel, said first filter for further defining a first baseband;

a high pass filter coupled to said node by a second channel, said second filter for further defining a second baseband;

power estimating means coupled to the output of said high pass filter for estimating an undesired noise level; and determining means coupled to said power estimating means for determining if said undesired noise level is greater than a first predetermined aggregate power level, and in response thereto sending a signal to said active filter to selectively adjust for a predetermined amount of time, from defining said first bandwidth to defining said second bandwidth.

8. The receiver of claim 7 wherein said determining means in response to determining that said undesired noise is greater than a second predetermined aggregate power level, sends a signal to said AGC to decrease said aggregate signal gain.

9. The receiver of claim 8 wherein said low pass filter is comprised of a first soft filter and said high pass filter is comprised of a second soft filter.

10. The receiver of claim 9, wherein said second predetermined aggregate power level is less than or equal to a predetermined receiver sensitivity value.

11. A method for preventing saturation of a radio frequency receiver having a first bandwidth comprising the steps of:

receiving an input communication signal from within said first bandwidth through a first receiving path, said input communication having an aggregate received power level;

adjusting said first bandwidth to a second bandwidth having a greater frequency range than said first bandwidth;

measuring an aggregate noise level of said second bandwidth through a second receiving path, while concurrently receiving said input signal through said first path;

determining if said aggregate noise level of said second receiving path is greater than a predetermined aggregate noise level; and adjusting said aggregate received power level in response to determining that said aggregate noise level of said second bandwidth is greater than said predetermined aggregate noise level.

12. The method of claim 11 wherein said adjusting and said measuring steps are performed at a randomly generated frequency.

13. A receiver for receiving a communication signal from a first desired bandwidth comprising:

a first path for receiving a desired communication signal from said first desired bandwidth, said desired communication signal having a noise level and an aggregate received power level;

an adjustable filter defining said first desired bandwidth and, adjustable to define a second bandwidth greater than said first bandwidth;

determining means for determining said noise level of said second bandwidth;

comparing means from comparing said noise level of said second bandwidth to a first predetermined noise level; and adjusting means for adjusting said aggregate received power level in response to said comparing means determining that said noise level is greater than said first predetermined noise level.

* * * * *